Figure 1:
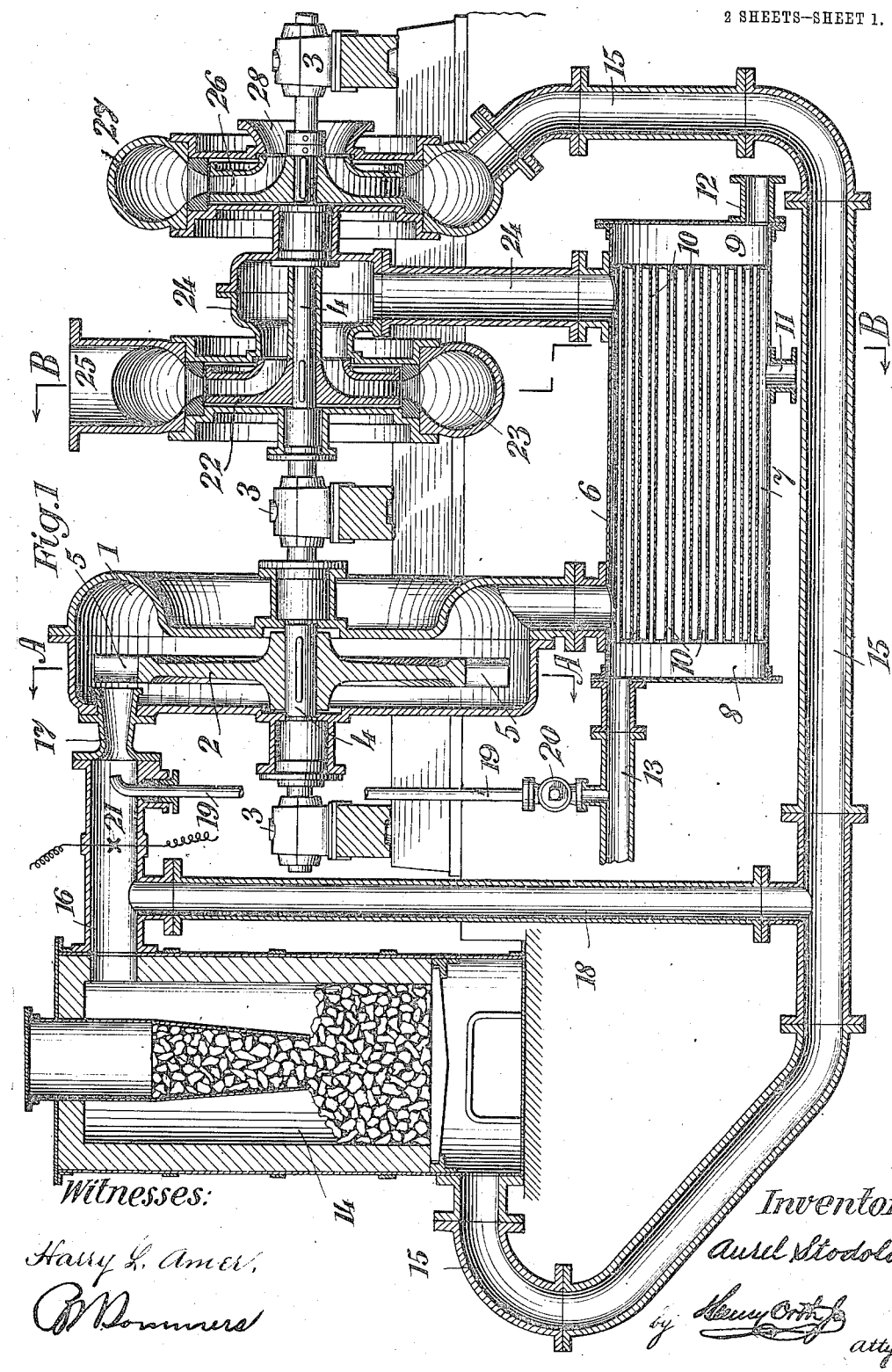

A. STODOLA.
GAS TURBINE.
APPLICATION FILED APR. 26, 1905.
991,179.
Patented May 2, 1911.
2 SHEETS—SHEET 2.
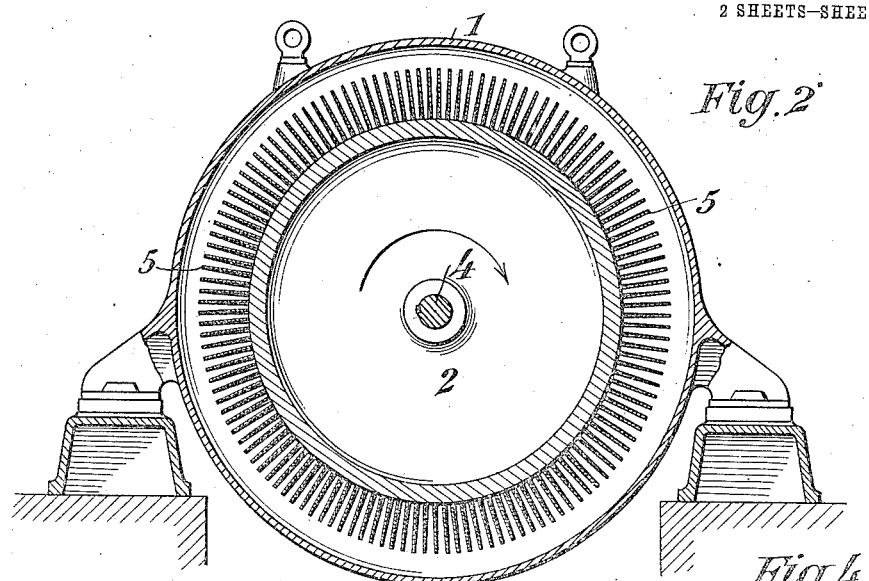
Fig. 2.
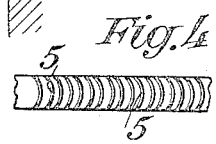
Fig. 4.
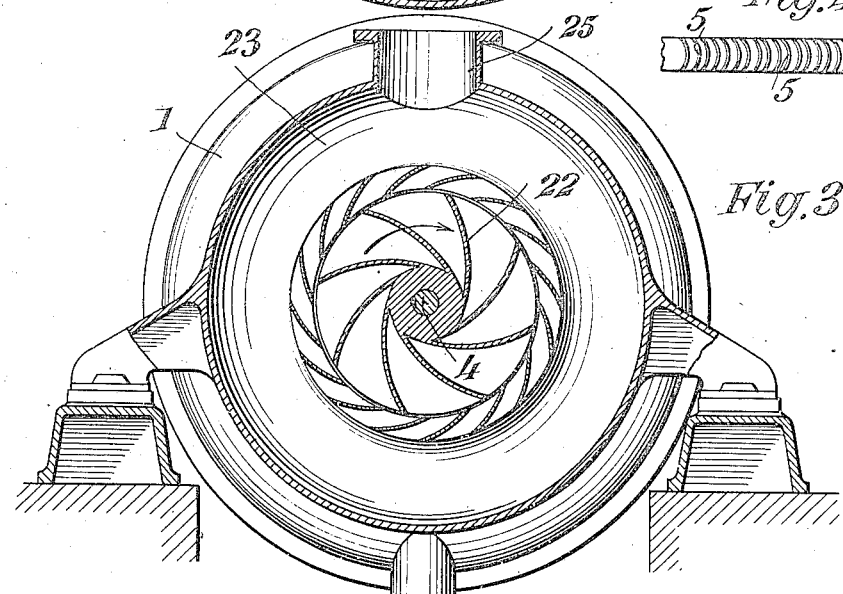
Fig. 3.
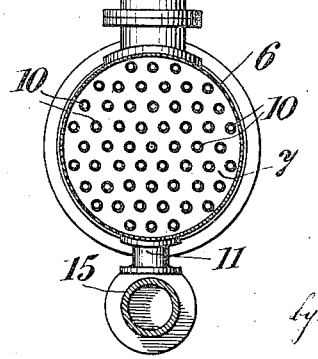
Witnesses:
Harry L. Amer.
B. Sommers
Inventor:
Aurel Stodola.
by Henry Orth
atty.

UNITED STATES PATENT OFFICE.

AUREL STODOLA, OF ZURICH, SWITZERLAND.

GAS-TURBINE.

991,179. Specification of Letters Patent. Patented May 2, 1911.

Application filed April 26, 1905. Serial No. 257,451.

*To all whom it may concern:*

Be it known that I, AUREL STODOLA, a subject of the King of Hungary, residing at Zurich, in the Republic of Switzerland, have invented new and useful Improvements in or Relating to Gas-Turbines, of which the following is a specification.

For the economical use of some gas turbines it has heretofore been found necessary in order to obtain a good efficiency to use special fuel as anthracite or coke, so that the gases can be compressed in compressors without forming deposits of tar or asphalt. Piston compressors have been used for this purpose and cause considerable complication and their use frequently entails the use of spur wheel transmission which is a serious disadvantage and loss due to the large amount of energy being consumed in running them.

The present invention is to obviate these disadvantages by driving the turbine under a vacuum, so that the wheel of the compressor rotates in considerably rarefied air and is therefore subjected to but small frictional resistance. This insures the additional advantage that the turbine wheels also rotate in rarefied air and so perform less work in compression. When it is desired to supply the mixture at comparatively low pressure, gas and air may be introduced into the turbine at atmospheric pressure, i. e., the turbine may be joined directly to an ordinary suction gas generator and the gases of combustion simply allowed to expand to below the atmospheric or vacuum pressure. If for example the vacuum amounts to 0.2 of an atmosphere, the same degree of efficiency is obtained as if the gases had been compressed from 1 to 5 atmospheres before entering the gas turbine. The important advantage however is secured of requiring only a single stage compressor for compressing the gases of combustion from the vacuum pressure to atmospheric pressure and then delivering them into the atmosphere.

As the gases flow directly from the suction generator into the turbine, they need not be cooled down; it is therefore possible to employ coal of any desired kind, the tars produced, (if any), passing directly, without being cooled down and consequently without being deposited, to the turbine and being there burned.

If it is desired to use higher degrees of expansion, this may be effected by the employment of a gas generator worked under pressure. Such gas generators are of themselves heretofore known but not in combination with the gas turbine and vacuum, by which the above described new effect of the reduction of friction is attained. The air is supplied to the suction gas generator by a distinct compressor, the most simple arrangement being a rotary compressor mounted on the shaft of the turbine. A portion of the previously compressed air is mixed with the gas before its entrance to the turbine and with this arrangement the advantage of being able to use any combustible is still secured, as the gases pass directly into the turbine and are there burned.

The system of the turbine and the special working cycle of the gases is independent of the method of the combustion, and whether the turbine works at constant pressure or by explosion is entirely immaterial in a turbine plant according to this invention.

The accompanying drawings illustrate by way of example one construction of apparatus according to this invention. Figure 1 thereof shows the apparatus in vertical longitudinal section. Fig. 2 is a transverse section through the turbine corresponding to the line A—A of Fig. 1. Fig. 3 is a transverse section corresponding to the line B—B of Fig. 1, and Fig. 4 is a developed view of part of the turbine wheel.

Within the turbine casing 1 is located a turbine wheel 2 that is fixed upon a rotary shaft 4 mounted in bearings 3. The turbine wheel 2 is provided upon its periphery with approximately radially arranged blades 5 of sickle shaped transverse section. In communication with the turbine casing 1 is a cooling apparatus which in the example illustrated is connected to the underside of the casing 1 and comprises a cylindrical casing 6 inclosing a central chamber 7 and two end chambers 8 and 9, which latter are connected with one another by tubes 10 that extend longitudinally through the central chamber 7 and are arranged parallel to one another. Communicating with the chamber 7 is a pipe 11 for carrying off water and which pipe may, if desired, be connected to a suitable pump.

12 is the cooling water supply pipe connected to the chamber 9 and 13 is the cooling water exit pipe connected to the chamber 8.

14 denotes a gas producer, of any appropriate kind, of the suction type to which air to support combustion is supplied at a certain pressure by a pipe 15 opening into the gas producer underneath the fire grate.

Means for delivering the necessary water supply to the gas producer are not shown in the drawing.

The gas producer 14 is connected to the turbine casing 1 by a pipe 16 and inlet jet 17 and the pipe 16 is also connected by a pipe 18 with the air supply pipe 15. Connected with the cooling water exit pipe 13 is a branch pipe 19 which discharges into the pipe 16 in front of the inlet end of the jet 17. A small force pump 20 is inserted in this pipe 19 for the purpose of spraying any cooling water that may be required into the jet. The pipe 16 is furnished at a part between the points where the pipes 18 and 19 communicate therewith with an electrical igniting device 21.

A single stage centrifugal exhauster, provided with a rotary suction member 22 that is mounted upon the turbine shaft 4 and a pressure chamber 23 encircling the same, is connected by a suction chamber and suction pipe 24 with the central or gas chamber 7 of the cooling apparatus, while an exhaust conduit 25 leads from the pressure chamber 23 into the atmosphere. In addition to this exhauster, a centrifugal compressor is provided, which also has a rotary member 26 mounted upon the turbine shaft and a pressure chamber 27 encircling it. This pressure chamber 27 is connected with the air delivery pipe 15.

28 is a suction funnel joined to the centrifugal compressor.

The working of the above described apparatus is as follows: The air compressor 26, 27 draws fresh air through the funnel 28, compresses it to a fixed pressure and forces it through the pipe 15 into the gas producer 14 in the interior of which the same pressure exists. The gas produced flows through the pipe 16 and there mixes with compressed air issuing from the branch pipe 18 and is electrically ignited by the device 21, and if necessary, takes up water or water vapor through the pipe 19. The highly heated mixture then passes through the jet 17 into the turbine casing 1 and impinges upon the blades 5 of its wheel 2, which is thereby set in rotation in the direction of the arrow, Fig. 2. The mixture hereupon expands in the casing 1 to below atmospheric pressure after which it passes into the cooling chamber 7 and is cooled down by the cooling water flowing through the pipes 10; by this means the water emerging from the cooling apparatus through the pipe 13 and passed, if necessary, into the pipe 19 and mixing pipe 16 is simultaneously preheated. The compressor 22, 23 draws the mixture from the cooling apparatus at below atmospheric or vacuum pressure and compresses it to atmospheric pressure in order to expel it into the atmosphere through the exhaust branch 25.

The force pump 20 in the pipe 19 may be omitted and a supply of cooling water under pressure may be substituted therefor.

Having now particularly described and ascertained the nature of the said invention and in what manner the same is to be performed I declare that what I claim is:

1. In a gas turbine plant the combination with the turbine, of a source of motive gas directly connected to and directly discharging the uncooled gas into the turbine, an igniter for the gas as it enters the turbine and means to cause said gas to expand below the atmospheric pressure and simultaneously exert suction on the gas coming from the said source.

2. In a gas turbine plant, the combination with a gas turbine of a suction gas producer connected to and directly supplying uncooled gas to the turbine, an igniter for the gas as it enters the turbine, a condenser and means driven by the turbine to draw the gas from the producer through the turbine and condenser, thereby expanding the gas to below atmospheric pressure.

3. In a gas turbine plant, the combination with the turbine, of a suction gas producer discharging directly into the turbine, an igniter for the gas, a condenser, means driven by the turbine and condenser to cause the exhaust gases from the turbine to expand below atmospheric pressure and exert suction on the producer, and a condenser interposed between the turbine and said means to cool the exhaust gases, substantially as described.

4. In a gas turbine plant the combination with a turbine, of a suction gas producer, an igniter, an expanding nozzle into which the ignited gases from the producer discharge, said nozzle in operative relation to the turbine, a condenser into which the exhaust gases discharge, and an exhauster directly driven by the turbine to deliver the gases after passing through the condenser to the atmosphere, whereby said exhaust gases will expand below atmospheric pressure and suction be exerted on the producer.

5. In a gas turbine plant the combination with a gas turbine and its shaft, of a suction gas producer, an igniter, an expanding nozzle between the producer and turbine, a condenser into which the turbine exhausts, an exhauster mounted on the turbine shaft and connected to the condenser, a rotary compressor also on the turbine shaft connected to the producer, substantially as described.

6. In a gas turbine plant, the combination with a suction gas producer, of a turbine wheel to which the gas from said producer is directly discharged, an igniter for the gas, a turbine casing in which said wheel is mounted, a condenser connected to the casing to cool and condense the volume of the gas after passing through the turbine, and a centrifugal exhauster to exhaust the gas from the condenser, whereby a continuous suction is maintained on the producer by reason of the continuously open through passage between the producer and exhauster.

7. In a gas turbine plant the combination with the turbine, of a source of motive gas directly connected to and discharging the uncooled gas into the turbine, means between the source and turbine to supply air, an igniter to ignite the gas mixture as it enters the turbine and means to cause the products of combustion to expand below atmospheric pressure and simultaneously exert suction on the source.

8. In a gas turbine plant the combination with a gas turbine of a gas producer directly connected to and supplying uncooled gas to the turbine, an igniter for the gas as it enters the turbine and means to produce a suction on the products of combustion as they pass through the turbine and cause them to expand below atmospheric pressure.

9. In a gas turbine plant, the combination with a gas turbine of a gas producer connected to and directly discharging hot gases into the turbine, means between the producer and turbine to supply air, an igniter for the gas as it enters the turbine and means to cause the products of combustion of the gas to expand below atmospheric pressure and exert suction through the turbine and draw the gas from the producer.

In testimony whereof I have signed my name to this specification in the presence of two subscribing witnesses.

AUREL STODOLA.

Witnesses:
A. FERRARI,
C. V. VISGLICE.